Jan. 23, 1962     B. C. COONS ET AL     3,018,179
PEAR PEELING, CORING AND TRIMMING MACHINE
AND METHOD AND PRODUCT THEREOF
Filed Nov. 25, 1955     11 Sheets-Sheet 4
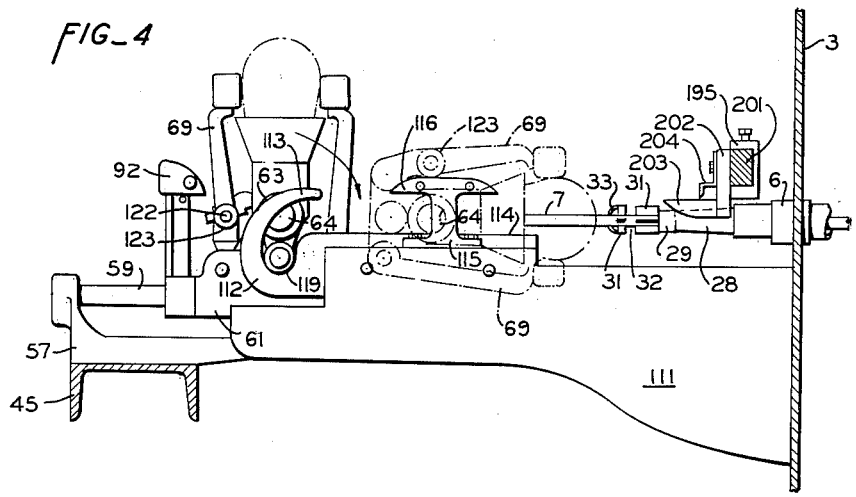
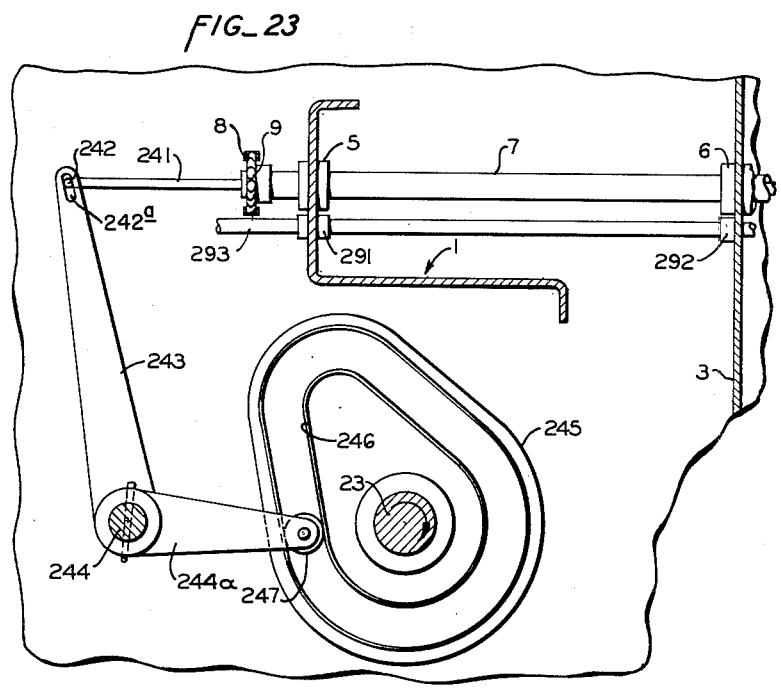
INVENTORS
BURTON C. COONS
WILLARD B. COONS
BY
*ATTORNEYS*

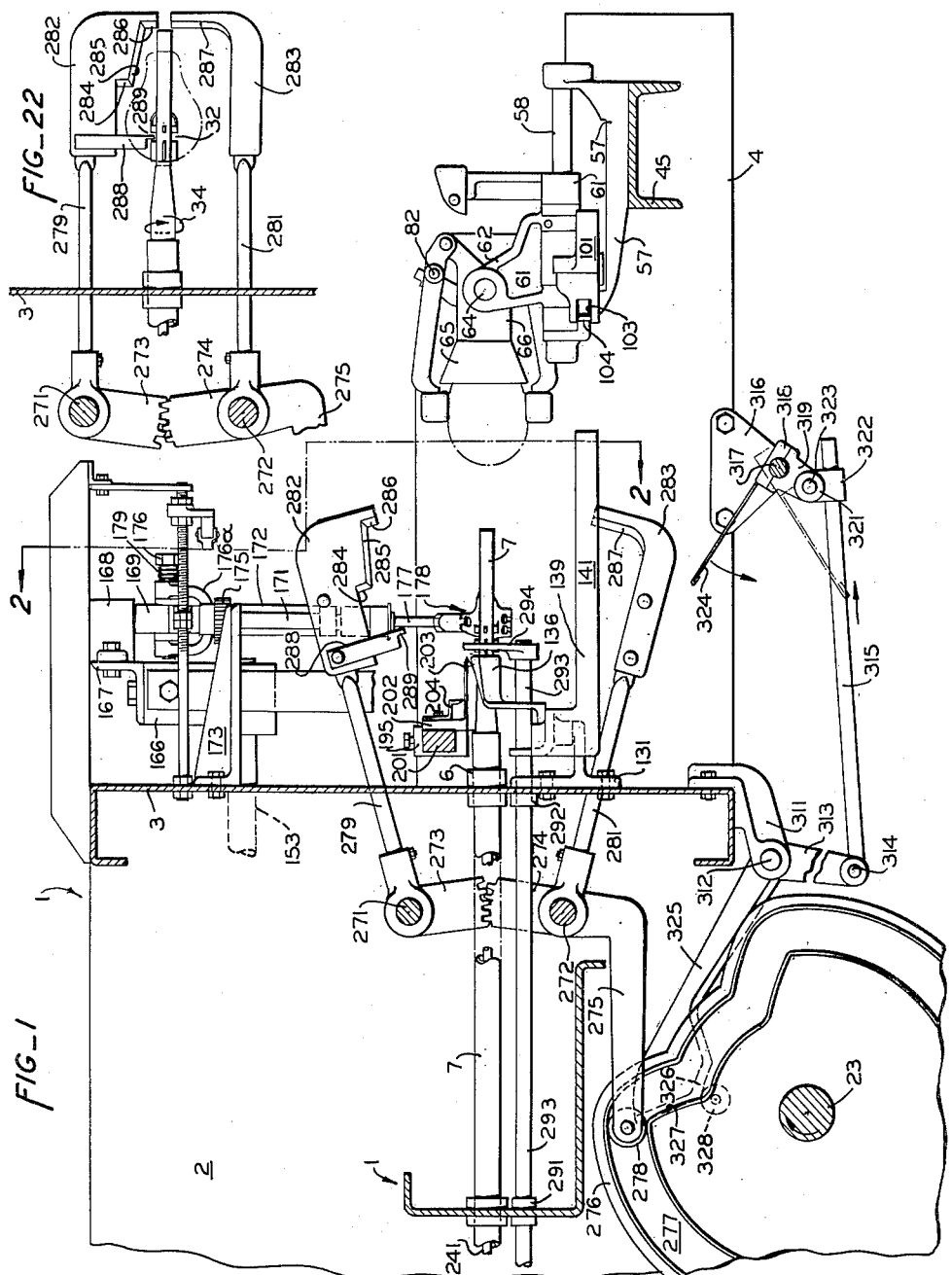

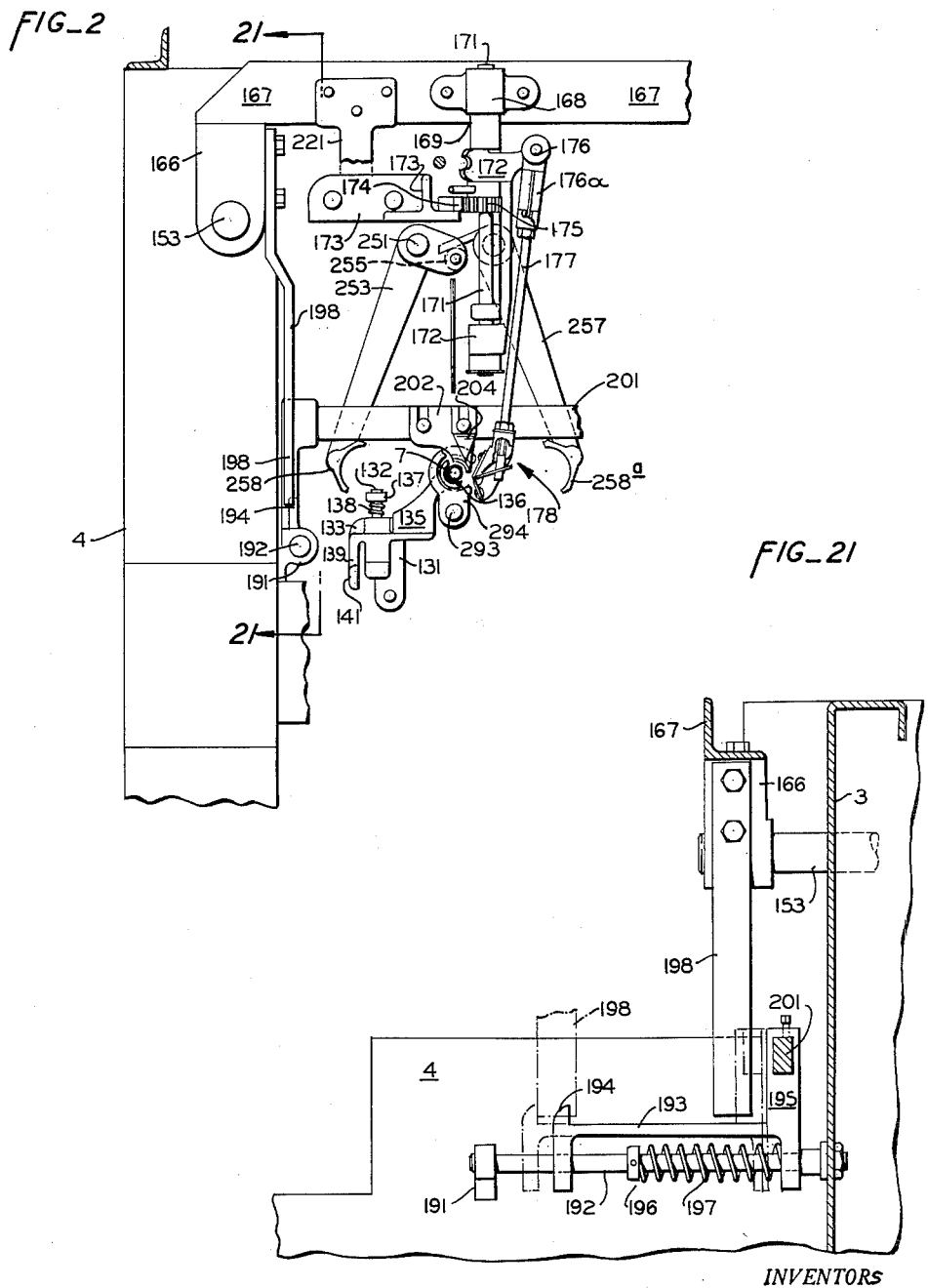

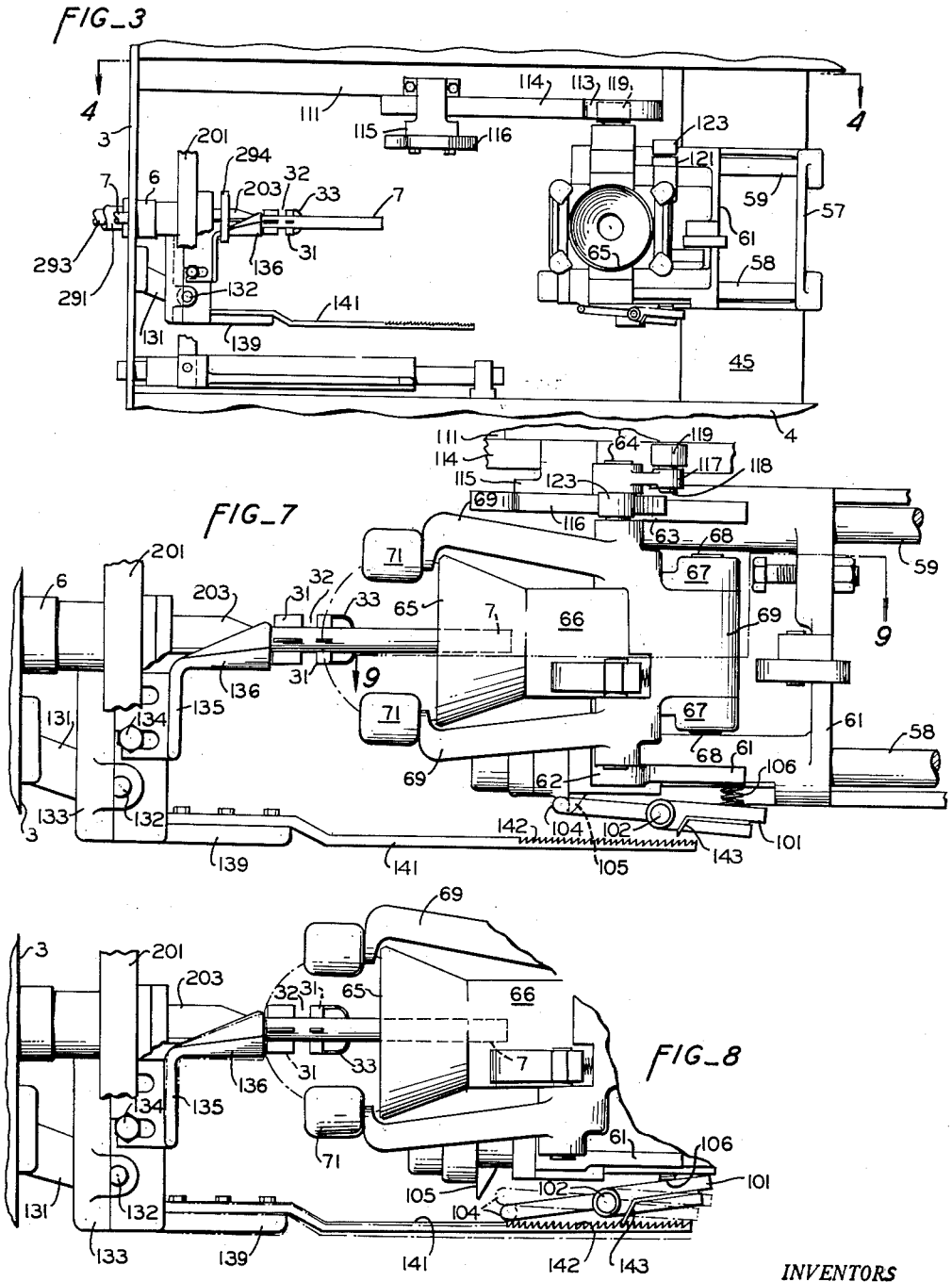

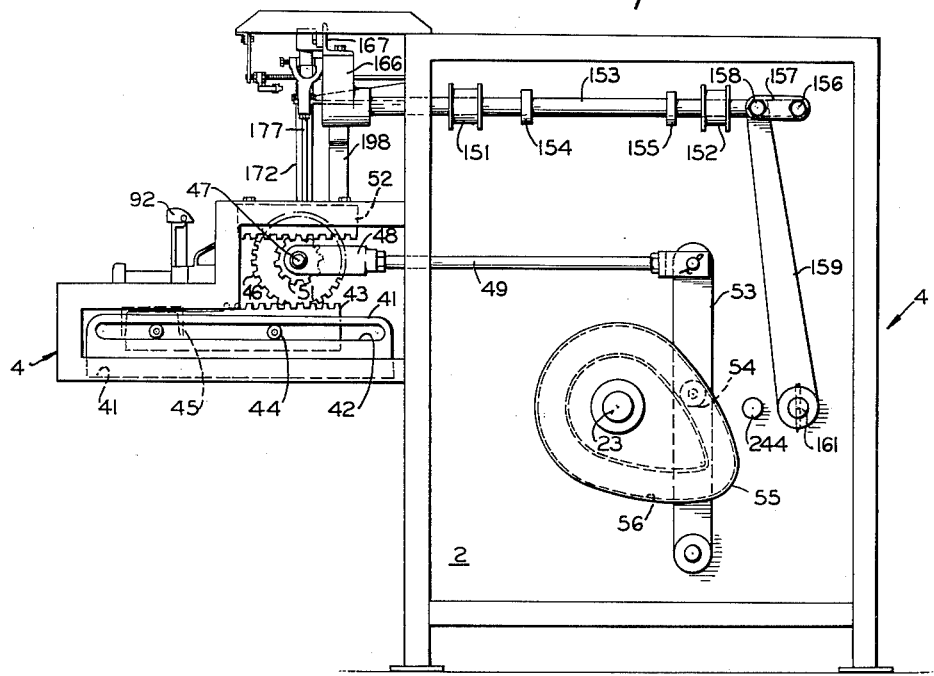
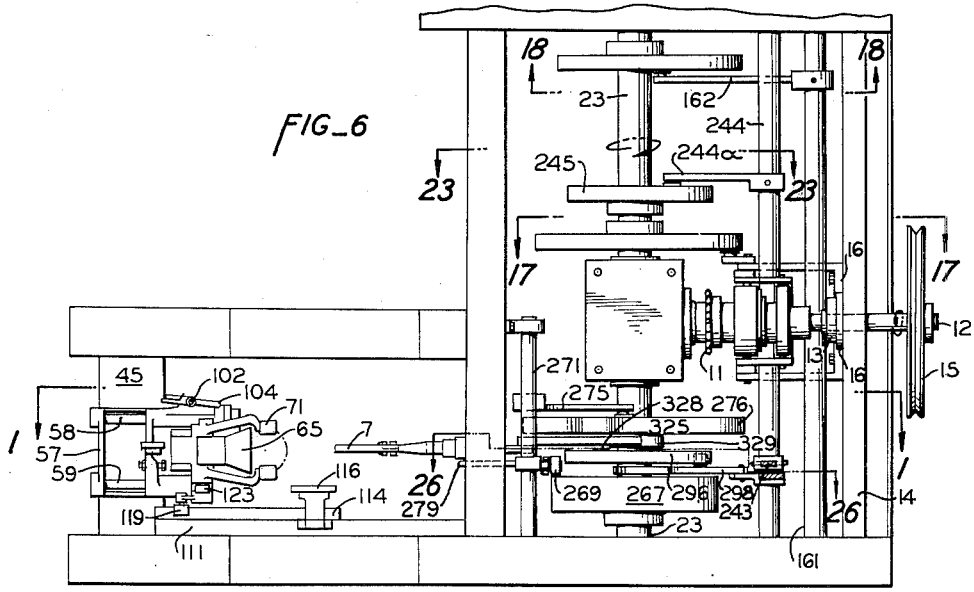

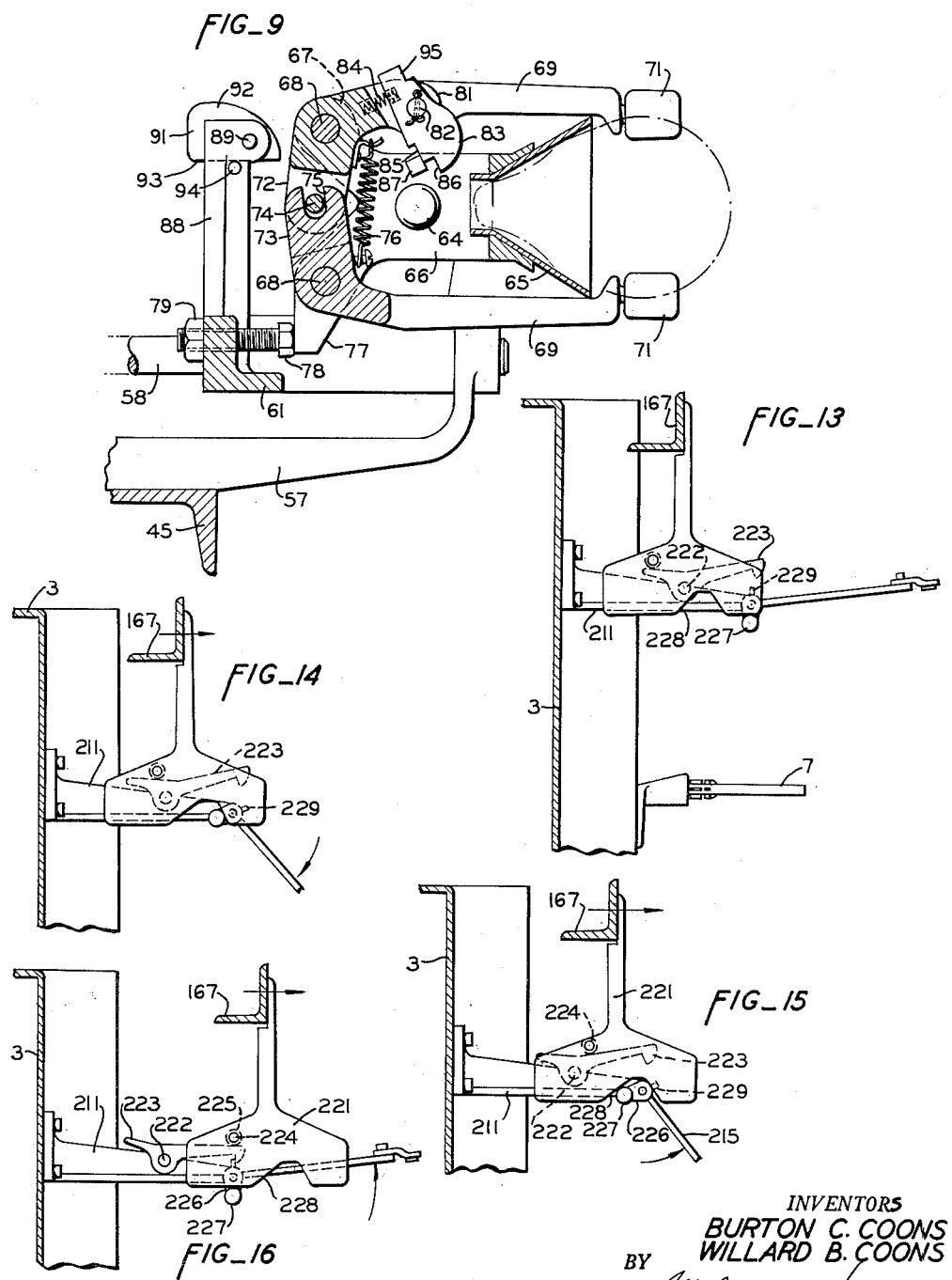

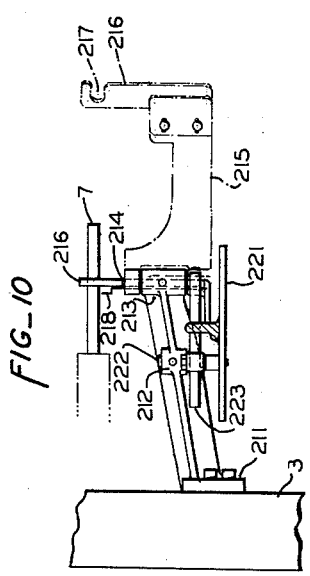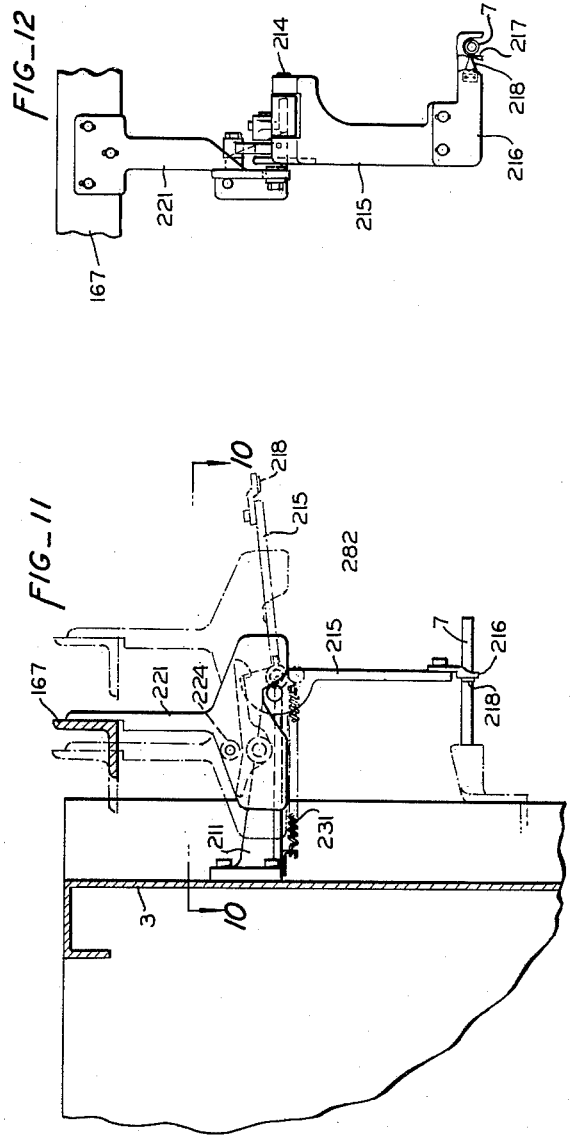

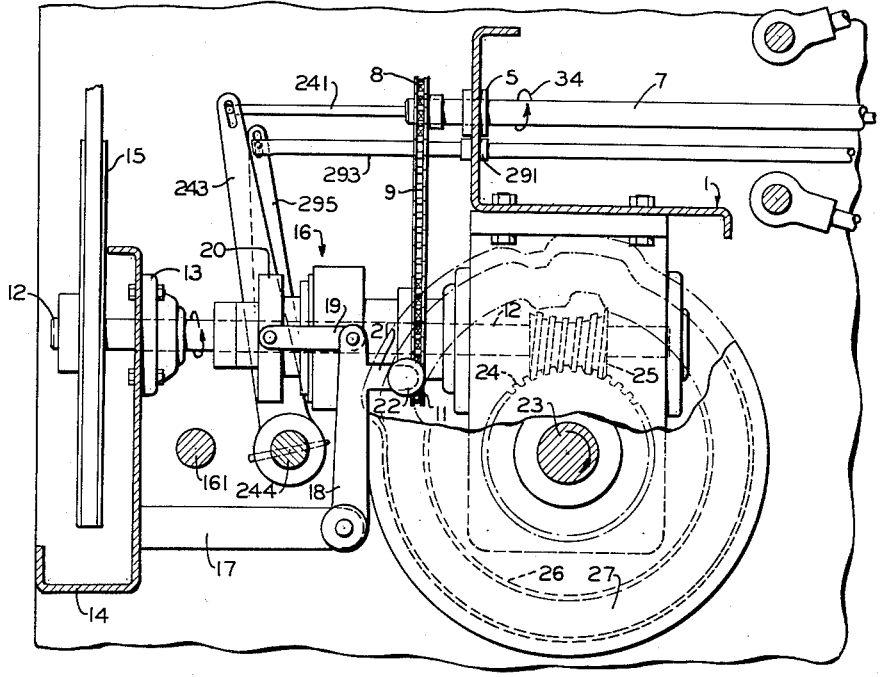
FIG_17
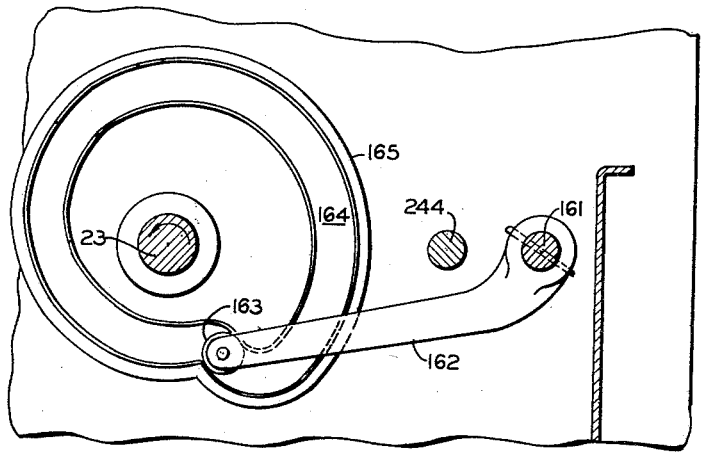
FIG_18
INVENTORS
BURTON C. COONS
WILLARD B. COONS
BY
ATTORNEYS Jan. 23, 1962 B. C. COONS ET AL 3,018,179
PEAR PEELING, CORING AND TRIMMING MACHINE
AND METHOD AND PRODUCT THEREOF
Filed Nov. 25, 1955 11 Sheets-Sheet 9
FIG_19
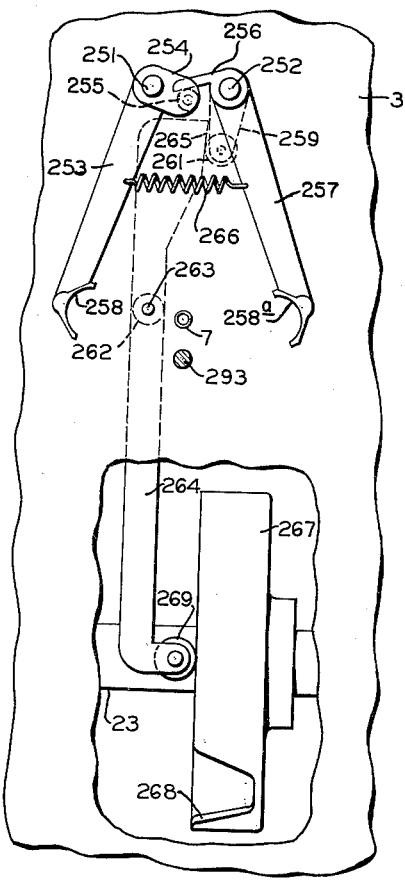
FIG_20
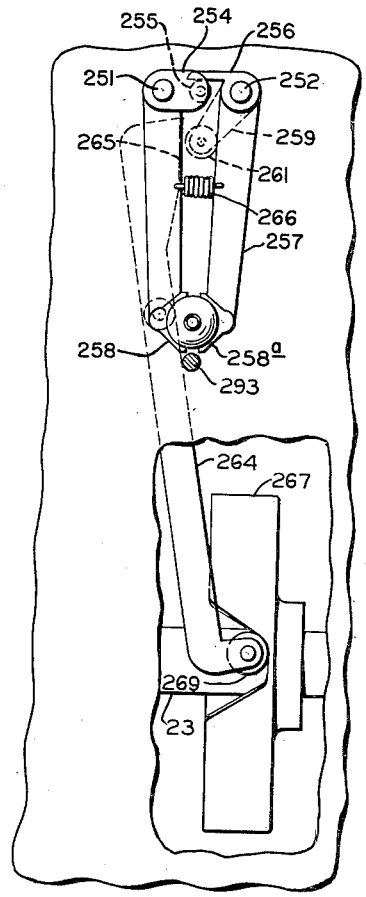
FIG_25
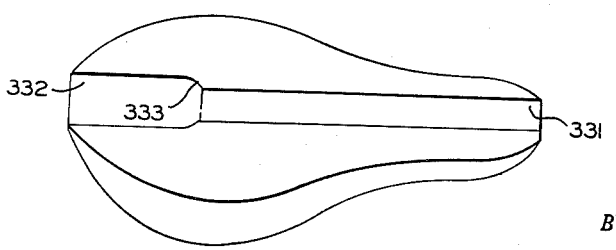
INVENTORS
BURTON C. COONS
WILLARD B. COONS
BY
Mellin and Hansom
ATTORNEYS

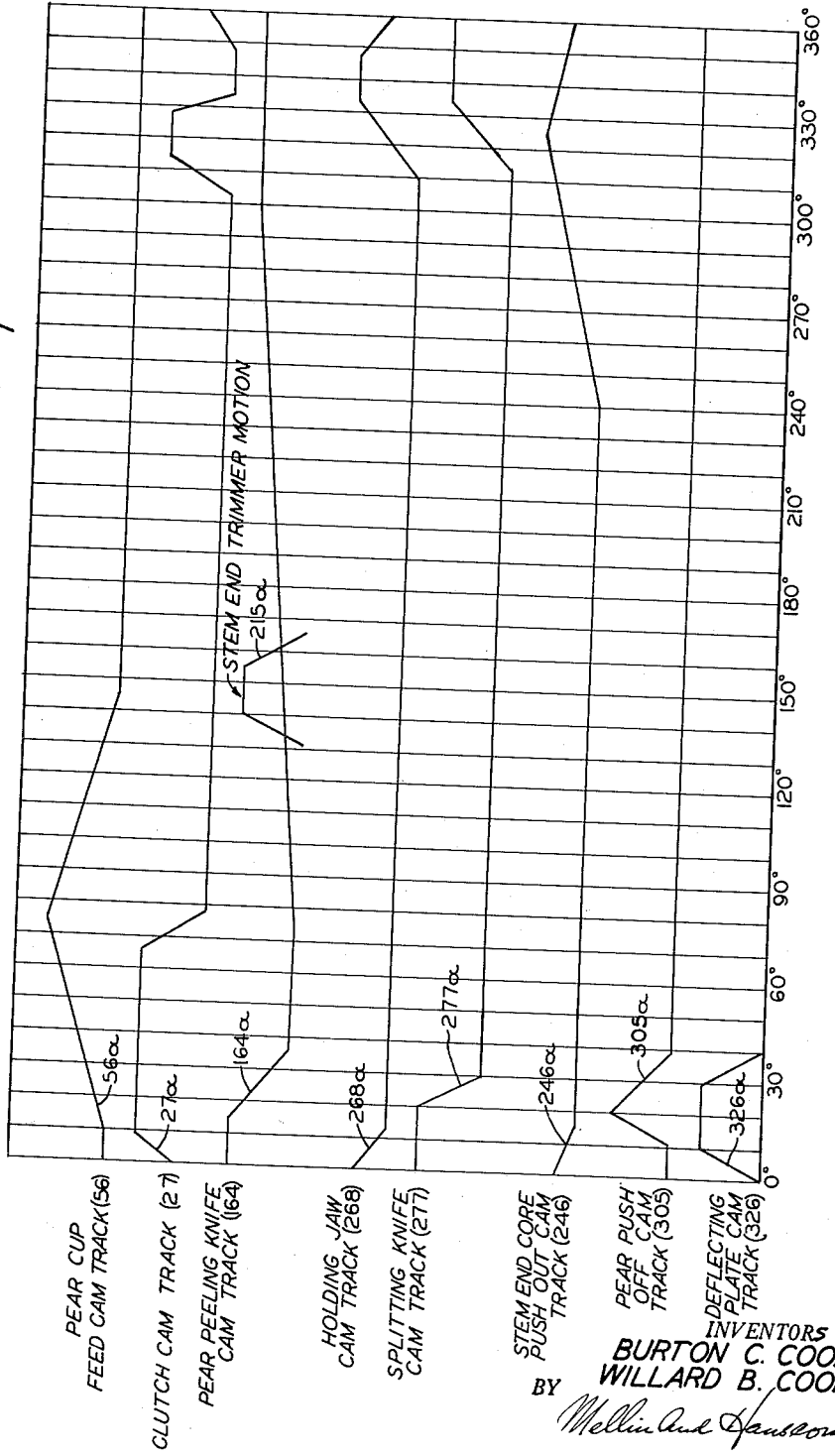

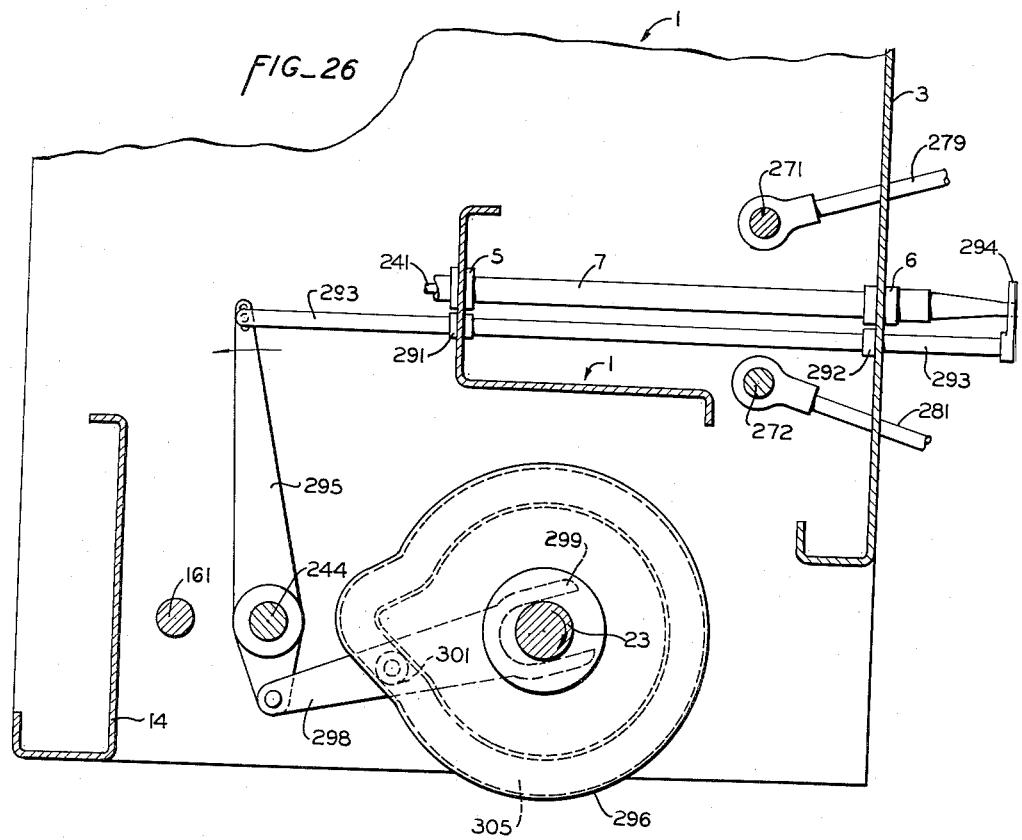

United States Patent Office 3,018,179
Patented Jan. 23, 1962

3,018,179
PEAR PEELING, CORING AND TRIMMING MACHINE AND METHOD AND PRODUCT THEREOF
Burton C. Coons, San Jose, Calif. (Hawaiian Village Hotel, Waikiki, Honolulu, Hawaii), and Willard B. Coons, 30 Alviso-Santa Clara Road, Santa Clara, Calif.
Filed Nov. 25, 1955, Ser. No. 549,009
11 Claims. (Cl. 99—100)

This invention relates to and in general has for its object the provision of a machine for peeling, coring, and trimming pears of indiscriminate size and hardness.

For economical reasons, all pears from a given orchard or section thereof have to be picked at one time even though they vary considerably in size and hardness. Presently, about 95 percent of all pears processed in the United States are cored, peeled, and trimmed on one of two machines. Because of the limitations of these machines the canners have adopted certain standards with respect to the maximum and minimum sizes and hardness of the pears acceptable by them for canning. The pears must not be greater than 4 inches or less than 2½ inches in length and must lie within a range of 1½ to 18 hardness.

In one of these machines peeling is done by a knife having the configuration of a halved pear, and the knife has to be sufficiently smaller than the pear being peeled to allow for irregularities in its configuration, for otherwise portions of the pear would remain unpeeled. Because of this and other limitations, all pears handled on this type of equipment have to be graded into seven different classifications, this being done prior to the time that the pears are placed in or taken from cold storage.

In the other machine referred to, peeling is effected by six knives traveling longitudinally over the pear in substantial conformation to the contour thereof. Each knife is slightly arcuate but can be made to substantially conform to the contour of pears lying within a rather limited range of diameters. This necessitates that the pears be graded before processing into five different classifications.

In both machines, the knives have to be changed and the machines adjusted when going from one classification to the next classification. It can therefore be seen that both machines are subject to three major objections. Both require that the pears be graded to numerous classifications prior to processing, and this, of course, represents an initial cost before the pears even reach the processing machines. Both machines have to be set or reset prior to operating on any pears of a particular classification. And both have to take excessively heavy cuts when peeling, either to compensate for the irregularities in the configuration of the pears or to compensate for the differences in the diameters of the pears falling within a single classification. In many instances such excessive cuts result in the downgrading of the finished product, for grading of the finished product is done on a basis of size. More specifically, this may necessitate filling a can with five pear halves rather than with four.

In so far as end result is concerned, it is one of the objects of this invention to provide a pear processing machine capable of handling pears of any hardness and size falling within the maximum and minimum limits presently adhered to by the canners without the necessity of pre-grading them and with a minimum loss of flesh.

Generally, the object of this invention is the provision of a pear processing machine comprising: a hollow, rotatable spindle provided along its length with a set of radially extending fins; means for coaxially impaling a pear on said spindle over said fins; means for gauging the position of said pear longitudinally on said spindle in relation to its calyx end independently of the length and hardness of said pear; a peeling knife arranged to traverse the length of said pear while said spindle is rotating and in so doing to follow the contour of said pear; a stem end trimming knife arranged to move into cutting engagement with the stem end of said pear during its rotation; a stem core pusher reciprocably mounted within said spindle for removing the stem core therefrom; a seed-cell pod coring knife mounted adjacent and in parallelism with said spindle rearwardly of said fins and arranged to advance forwardly into said pear during the rotation of said spindle, thereby to make a cylindrical cut in said pear circumscribing said seed-cell pod; a calyx end trimming knife arranged to travel forwardly with said seed-cell pod coring knife, thereby to trim the calyx end of said pear during the rotation thereof; means for periodically holding said pear against rotation; a seed-cell pod core severing knife extending between said spindle and the outer forward end of one of said fins, said severing knife operating to sever said seed-cell pod from said pear upon the rotation of said spindle relative to said pear; a plurality of splitting knives arranged to close radially upon said spindle forwardly of said fins; and a pusher surrounding said spindle rearwardly of said fins and operable to push said pear forwardly along said spindle and through said knives.

A further and specific object of this invention is the provision in a pear preparing machine of the character above described, of a cup assembly carriage reciprocating to and from said spindle; ways mounted on said carriage in parallelism with said spindle; a cup assembly slidable on said ways relative to said carriage; a latch lever pivotally mounted on said cup assembly for detachably locking said cup assembly to said carriage to constrain said cup assembly to advance rearwardly towards said spindle with said carriage; a trigger lever pivotally mounted on said machine laterally of and adjacent said spindle, said lever having a bifurcated end surrounding said spindle at a predetermined point thereon; and a forwardly extending arm fixed to the opposite end of said lever and provided on its front end with a set of forwardly and inwardly directed teeth, said teeth being arranged to engage the forward end of said latch lever in response to the contact of a pear impaled on said spindle with the bifurcated end of said trigger lever, thereby to disengage said cup assembly from said carriage and thus arrest any further rearward movement of the cup assembly.

Still another and specific object of this invention is the provision in a machine of the character above described, of a hollow spindle provided with radially extending pear-keying fins, notches formed in said fins and a finger movable in said notches during the rotation of said spindle and while a pear is impaled thereon with said fins disposed within the seed-cell pod of the pear.

Another and specific object of this invention is the provision in a machine of the character above described of a spindle provided with radially extending fins arranged to be encompassed by the seed-cell pod of a pear coaxially impaled on said spindle; a forwardly extending seed-cell pod coring knife mounted rearwardly of and in parallelism with said fins; means for moving said knife forwardly into the calyx end of said pear during the rotation of said spindle, thereby to make a cylindrical cut in said pear immediately surrounding its seed-cell pod; and an arcuate knife mounted between the outer forward corner of one of said knives and said spindle serving to sever the cylindrical seed-cell pod core cut by said first knife, while said pear is held against rotation and said spindle is rotating.

Still another object of this invention is the provision in a machine of the character above described of a deflecting plate pivotally mounted below the machine spindle and means for rearwardly inclining said plate when a pear is being discharged from said spindle and for forwardly inclining said plate during the remainder of the cycle of operation of the machine, thereby to segregate the processed pears from the resulting refuse.

A further object of this invention is the provision in a machine of the character above described of a spindle, means for impaling a pear on said spindle, a set of knives arranged to close on themselves forwardly of said pear and in line therewith, and means for pushing said pear forwardly along said spindle and over said knives, thereby to cut said pear into sections.

Another object of this invention is the provision in a machine of the character above described of a frame; a hollow spindle journaled in said frame; a carriage mounted in said frame above said spindle and for movement in parallelism therewith; a depending bracket mounted on said carriage; a hinge plate pivoted to said bracket on a horizontal axis and arranged to swing from a substantially vertical depending position to a substantially horizontal position, said hinge plate being provided with a notched finger arranged to overlie and seat on said spindle; a pear stem end trimming knife mounted on said finger immediately adjacent said notch; and means for swinging said hinge plate from its horizontal position to its vertical position in response to the forward movement of said carriage.

Still another object of this invention is the provision as a new article of manufacture of a seed-cell pod cored, stem cored, stem end and calyx end trimmed and peeled whole pear, this being particularly important for the reason that a whole pear will produce about a 5 percent greater yield of diced fruit than can be produced from both halves of the identical pear.

The invention possesses other advantageous features, some of which, with the foregoing, will be set forth at length in the following description where those forms of the invention which have been selected for illustration in the drawings accompanying and forming a part of the present specification, are outlined in full. In said drawings, one form of the invention is shown, but it is to be understood that it is not limited to such form, since the invention as set forth in the claims may be embodied in other forms.

Referring to the drawings,

FIG. 1 is a fragmentary vertical mid-section taken through a pear preparation machine, this section being taken substantially on the section line 1—1 of FIG. 6, but for the sake of clarity omits the pear-gripping jaws used for holding the pear against rotation with the spindle during the time that the cylindrical seed-cell pod core is being cut.

FIG. 2 is a fragmentary front elevation of the processing machine shown in FIG. 1 taken forwardly of the feeding mechanism substantially on the section line 2—2 of FIG. 1.

FIG. 3 is a top plan fragmentary view of the machine illustrated in FIG. 1, and wherein again for the purposes of clarity the pear-gripping jaws, pear peeler and pear-sectioning knives have been omitted.

FIG. 4 is a fragmentary right hand side vertical section of the machine illustrated in FIG. 1 taken substantially on the section line 4—4 of FIG. 3, particularly disclosing the pear centering and feeding cups as related to the pear spindle, but wherein the peeling, seed-cell corer, trimmers, and sectioning knives have been omitted.

FIG. 5 is a right hand side elevation of the machine particularly showing the pear centering and feed cup drive mechanisms.

FIG. 6 is a fragmentary top plan of the machine as illustrated in FIG. 5 particularly showing its driving mechanism, but wherein the actual pear processing mechanism has been omitted from its left hand end.

FIG. 7 is a fragmentary top plan detail of the pear centering and feeding cup and the mechanism associated therewith, whereby the advance of the cup is arrested when the calyx end of the pear reaches a predetermined position, the cup here being shown in an intermediate position.

FIG. 8 is a fragmentary top plan view similar to FIG. 7, but wherein the cup has reached its limit of forward travel and is fully impaled on its spindle.

FIG. 9 is a fragmentary detailed vertical section taken through the pear centering and feeding cup.

FIG. 10 is a fragmentary horizontal section of the stem end trimmer of the machine taken on the section line 10—10 of FIG. 11 and showing the trimmer in its lowermost operative position.

FIG. 11 is a fragmentary left hand side elevation of the stem trimmer shown in FIG. 10.

FIG. 12 is a fragmentary front elevation of the trimmer shown in FIGS. 10 and 11.

FIG. 13 is another left hand end fragmentary elevation of the stem end trimmer, wherein the trimmer is shown in its uppermost and inoperative position.

FIG. 14 is a fragmentary view similar to FIG. 13 but showing the trimmer on its way down to its operative or centering position as illustrated in FIGS. 10, 11, and 12.

FIGS. 15 and 16 also are fragmentary views similar to FIG. 13, but illustrating the stem end trimmer in an intermediate position and in uppermost and inoperative position, respectively.

FIG. 17 is a fragmentary vertical section taken on the section line 17—17 of FIG. 6 particularly showing the main drive of the machine and the cam controlled clutch for driving the pear spindle.

FIG. 18 is a fragmentary vertical section taken on the section line 18—18 of FIG. 6 showing the cam control drive for actuating the pear peeling knife.

FIG. 19 is a fragmentary front elevation of the pear-gripping jaws and their cam controlled actuating mechanism, the jaws being shown in their open position, and a portion of the machine frame being broken away to make visible the cam and cam follower.

FIG. 20 is a fragmentary view similar to that shown in FIG. 19, but showing the jaws closed about a pear.

FIG. 21 is a fragmentary vertical section taken on the section line 21—21 of FIG. 2 showing the reciprocating carriage on which the calyx end trimmer and seed-cell pod coring knife are mounted and the actuating mechanism associated therewith.

FIG. 22 is a fragmentary left hand side elevation of the pear sectioning knives and their actuating mechanism.

FIG. 23 is a fragmentary vertical section taken on the section line 23—23 of FIG. 6 showing the cam controlled mechanism for actuating the stem core pusher.

FIG. 24 is a diagram showing in development the contour of the endless cam tracks used for controlling the various elements of the machine and which indicate the sequence of operation of such elements during one complete cycle of operation.

FIG. 25 is a perspective view of one half of a pear peeled, trimmed, cored, and halved on the machine illustrated in the figures above described.

FIG. 26 is a fragmentary transverse horizontal section taken on the section line 26—26 of FIG. 6.

*Mounting frame in general*

The machine as shown in these various figures is mounted on and supported by a rectangular parallelepiped form of frame generally designated by the reference numeral 1, and including opposed parallel end plates 2, a front panel 3, and parallel, forwardly extending frame members 4 (FIGS. 1 and 5). As will presently appear from the following description, all of the pear processing elements are located forwardly of the front panel 3, whereas substantially all of the driving and control mechanisms therefor are located rearwardly of the panel 3.

*Pear supporting spindle*

Journaled in the frame 1 in bearings 5 and 6 transverseby the panel 3 and extending rearwardly and forwardly thereof is a rotatable hollow spindle 7 fixed against axial movement and of a diameter slightly greater than the stem core of a pear (FIGS. 7, 17, and 23). Secured to the rear end of the spindle 7 is a sprocket wheel 8 (FIGS. 17 and 23) driven by a chain 9, the chain 9 in turn being driven by a sprocket wheel 11 (FIGS. 6 and 17) journaled on a power take-off shaft 12. Rotatably supporting the shaft 12 is a bearing 13 mounted on a frame member 14, and keyed to the free rear end of the shaft 12 is a constantly motor driven power take-off pulley 15. Surrounding the shaft 12 rearwardly of the sprocket wheel 11 is a clutch of conventional construction and generally designated by the reference numeral 16 (FIGS. 6 and 17). Secured to and extending forwardly of the frame member 14 beneath the clutch 16 is a rigid bracket 17, and pivoted to the free end thereof is an upwardly extending link 18. Pivoted to the upper end of the link 18 and extending rearwardly thereof is a link 19 pivotally connected at its free end to the axially movable element 20 of the clutch 16. Formed integral with the link 18 intermediate its ends is a forwardly extending finger 21, and mounted on the end thereof is a cam follower roller 22.

Journaled in the frame 1 transversely of and beneath the driven shaft 12 is a constantly driven main drive shaft 23 (FIG. 17), and keyed thereto is a sprocket wheel 24 in driven engagement with a worm 25 fixed to the shaft 12. Keyed to the shaft 23 adjacent the shaft 12 is a cam disc 26 provided with an endless cam track 27 arranged to receive the cam follower roller 22 and having a contour indicated by the curve 27a of FIG. 24. As a result of this construction, it will be seen that the operation of the spindle 7 is under the control of the cam track 27.

Formed integral with the spindle 7 immediately forward of its bearing 6 is a tapered spacer 28 merging at its free end with a step 29 (FIG. 4). Secured to the spindle 7 forwardly of and in abutment with the step 29 is a plurality of radially extending, generally rectangular pear key fins or vanes 31, interrupted adjacent their front ends by cut-outs or notches 32. Welded to each of two or more of the fins 31 at the outer forward corners thereof and also to the spindle is a thin arcuate knife 33 formed with a cutting edge facing its direction of rotation, this direction being indicated by the arrow 34 in FIGS. 17 and 22. As will be later more fully described, the function of the arcuate knives 33 is to sever the seed-cell pod core from the body of the pear while the pear is held against rotation during a single revolution or less of the spindle.

Although of all the various elements and subassemblies making up our pear processing machine, the pear orienter and feeding mechanism first come into play, the spindle 7 and its associated parts have been described first for the reason that since the entire processing of the pear occurs while it is impaled on the spindle, all of the processing elements such as the corers, trimmers, peeler and sectioning knives center about the spindle.

*Pear orienting and feeding assembly*

It has been the observation of applicants that the center of the seed-cell pod of a pear irrespective of the size thereof is always located ⅞ of an inch from its calyx end, and that a core 1¼ inches long cut from the calyx end of the pear will always include substantially all of its seed-cell pod. The principal function then of the pear orienting and feeding assembly hereafter described is to impale a pear on the spindle 7 coaxially therewith and at a predetermined point thereon so that regardless of the size and hardness of the pear, the fins 31 and their severing knives 33 will always lie within the seed-cell pod zone of the pear and so that subsequently a cylindrical cut circumscribing the seed-cell pod, and of a length substantially equal thereto, can be made in the pear and severed therefrom by the knives 33.

To this end, a pair of opposed parallel plates 41 is mounted on the forwardly extending frame members 4, the plates being provided with elongated, slotted tracks 42 (FIG. 5). Mounted adjacent each of the slotted plates 41 is a lower rack 43, and journaled on the sides thereof are rollers 44 arranged to traverse the tracks 42. Secured to the forward ends of the opposed parallel racks 43 and extending therebetween is a carriage 45 of inverted channel form. Meshing with the lower racks 43 is a gear 46 keyed to a stub shaft 47, this shaft being journaled in the bifurcated end 48 of a connecting rod 49. Also keyed to the stub shaft 47 is a small gear 51, meshing at its upper side with an upper rack 52 fixed to the frame member 4. As a result of this construction, it will be seen that the axial reciprocation of the connecting rod 49 will cause an accelerated reciprocation of the channel shaped carriage 45.

Pivoted to the rear end of the connecting rod 49 is a lever 53, the lower end of this lever being pivotally anchored to the lower end of the right hand frame end plate 2 (FIG. 5). Journaled to lever 53 intermediate its ends is a cam follower roller 54. Keyed to the right hand end of the constantly driven main shaft 23 (FIGS. 5 and 17) is a cam 55 provided with an oval shaped cam track 56 arranged to receive the follower roller 54 and therefore to determine the cycle of operation of the carriage 45. The development of the track 56 shown by the curve 56a in FIG. 24 indicates the cycle of operation of the carriage 45.

Secured to the carriage 45 intermediate its ends is an upstanding way frame 57, and mounted therein in parallelism with the spindle 7 is a pair of tubular or cylindrical ways 58 and 59 (FIG. 1). Slidably mounted on the ways 58 and 59 is a cup carriage 61 provided with a pair of spaced, parallel upstanding bearing ears 62 and 63 (FIGS. 1 and 7). Journaled in the ears 62 and 63 is a pin 64, and fixed thereto intermediate said ears is a conical cup 65 arranged to assume either a vertical position or a horizontal position coaxial with the pear spindle 7. Formed integral with the base 66 of the cup 65 on the front and rear sides thereof are bearing bosses 67 for the reception of pins 68, and journaled thereon are forked pear-centering fingers 69. Formed on the free ends of the fingers are inwardly extending pear-gripping pads 71. Each such set of two fingers is arranged to move simultaneously inwardly or outwardly relative to the axis of the cup 65, thereby to center and clamp the calyx end of a pear coaxially with the cup, and therefore coaxially with the spindle 7 when the cup is in its horizontal position. Here it should be noted that an operator delivers a pear to the cup stem end down while the cup is in its upright position, and while the fingers 69 are in their retracted position, that the stem end of the pear is centered by the cup, and that thereafter the fingers 69 simultaneously converge on the bulbous portion of the pear, thereby to complete the centering operation and to resiliently grip the pear in such position while the cup is rotating to its horizontal position and advancing rearwardly of the machine to impale the pear coaxially on the spindle 7.

As best shown in FIG. 9, the lower free ends of the centering fingers are provided with inwardly turned, overlapping extensions 72 and 73, the end of the extension 72 being provided with a cross stop or limit pin 74 receivable in a notch 75 formed in the end of the extension 73, when the two pairs of fingers 69 are in their closed or contracted position. As a result of this structure, either set of fingers is constrained to move simultaneously and symmetrically in response to the movement of the other set of fingers.

Secured to and between the finger extensions 72 and 73 above the pivotal points thereof is a tension spring 76 for resiliently biasing the two sets of centering fingers to their closed positions with the pads 71 in engagement with the bulbous end of a pear.

Extending outwardly from and formed integral with the lower end of the cup base 66 is a rigid lug or finger 77. Threaded in the lower front end of the cup carriage 61 in the vertical plane of the finger 77 is a set screw or bolt 78, and threaded to the rear end thereof is a lock nut 79.

Formed on the inner side of one of the fingers 69 is a boss 81, and mounted therein is a pin 82. Journaled on the pin 82 is a dog or latch 83 biased clockwise as shown in FIG. 9 by a spring 84 and provided on its inner end with a pair of stepped notches 85 and 86. Fixed to the cup base 66 adjacent the notched end of the dog 83 is a square keeper bar 87 serving to hold the fingers 69 in a partially retracted position when the keeper notch 86 rests on the bar 87. Fixed to and extending upwardly from the front end of the carriage 61 in the vertical plane of the latch 83 is a post 88, and pivoted to the upper end thereof by a pin 89 is a latch 91 provided with a rounded upper side 92 and with flat lower side 93 as viewed in FIG. 9. Mounted on the post 88 beneath the latch 91 is a pin 94 for supporting the flat side 93 of the latch in a horizontal position. As a result of this construction, the outer end of the latch 83 can pass downwardly beneath the inner end of the latch 91 upon the counterclockwise rotation of the cup 65 and the parts attached thereto. In so doing, the latch 91 is free to rotate clockwise to let the outer end of the latch 83 clear the inner end of the latch 91, and thus permit the forward end of the latter to seat in a notch 95 formed in the upper outer corner of the latch 83. The fingers 69 are then resiliently held by the latch 83 in their fully open or expanded position as shown in FIG. 3 under the influence of the compression spring 84 and against the biasing action of the tension spring 76.

As thus far described, the cup carriage 61 is free to slide on the ways 58 and 59 and to travel with the carriage 45. To detachably latch the cup carriage 61 to carriage 45 a latch or latch rocker arm 101 is pivoted intermediate its ends by a vertical pin 102 to the left side of cup carriage 61 (FIGS. 1, 7 and 8). Formed on the rear end of the latch 101 is a notch 103, and closing the outer end thereof is a small cylindrical latch roller 104 journaled in the bifurcated end of the latch rocker arm 101. Extending laterally from the rear end of the way frame 57 in horizontal alignment with the roller 104 and immediately adjacent thereto is a keeper lug 105 having an inclined forward face. Mounted between the forward end of the latch 101 and the cup carriage 61 is a compression spring 106 for resiliently biasing the latch 101 to its closed position over the keeper lug 105 as shown in FIG. 7. As a result of this construction, the cup carriage 61 and its cup assembly can be made to travel forwardly with the carriage 45 so long as the latch 101 is engaged with the keeper lug 105.

*Centering and feed cup actuating mechanism*

Secured to the panel 3 and extending forwardly therefrom is a subframe or bracket 111 (FIGS. 3 and 4), and mounted on said bracket is a cam track plate 112. Provided in the forward end of the plate 112 is a hooked shaped cam track 113 merging at its rear end with a straight horizontal track extension 114. Also affixed to the frame or bracket 111 is a bracket 115, and secured thereto is an arcuate cam track 116.

Keyed to the shaft 64 (FIG. 7) is an arm 117, and mounted in the outer end thereof is a pin 118. Journaled on the pin 118 is a cam track follower roller 119 receivable in the hooked shaped cam track 113 (FIG. 4) and arranged to traverse the cam track extension 114. As a result of this construction, the rearward movement of the cup assembly constrains the follower roller to travel up the inclined rear surface of the hooked shaped cam track 113, and since the roller is pivoted below the axis of the cup shaft 64, the cup 65 and elements fixed thereto are caused to rotate clockwise to a horizontal position as viewed in FIGS. 4 and 9, or counterclockwise as viewed in FIGS. 1 and 8. The continued rearward travel of the cup in a horizontal position and in axial alignment with the pear spindle 7 is assured by the horizontal cam track extension 114.

Formed on one of the fingers 69 intermediate its ends (FIG. 3) is a boss 121, and mounted therein is an outwardly extending horizontal pin 122 (FIG. 4). Journaled on the pin 122 in the vertical plane of the arcuate cam 116 (FIGS. 3 and 4) is a cam follower roller 123. As a result of this structure, and as indicated in FIG. 4, the cam follower roller 123 engages the arcuate cam track 116 upon the rearward travel of the pear centering cup assembly whereupon the centering fingers 69 are retracted from the pear to their open position after the pear has been coaxially impaled on the pear spindle 7. The fingers 69 are thereafter held in their open position by the dog or latch 83 (FIG. 9) which has by this time come into locking engagement with the keeper bar 87, and remain open during the remainder of the cycle of operation and until the cup is again upset from its initial vertical position to its horizontal position in preparation for the start of the next succeeding cycle of operation.

As thus far described then, the cup assembly reciprocates to and from the spindle, the cup moves from a vertical charging position to a horizontal spindle receiving position and back to its vertical position, and the pear-gripping fingers close upon a pear and then open after the pear has been impaled upon the spindle.

*Cup carriage release mechanism*

As previously set forth, one of the objects of this invention is to precisely gauge or determine the position of the pear on the spindle in relation to the calyx end of the pear independently of its size and hardness. To this end a forwardly extending bracket 131 is mounted on the panel 3 adjacent the spindle 7, and pivoted thereto on a vertical pin 132 is a rocker arm 133 (FIGS. 1, 3, 7, and 8). Adjustably secured to the inner end of the rocker arm by screws 134, and forming an integral part thereof, is a trigger rocker arm 135 provided with a forwardly bent and forked or bifurcated extension 136 partially surrounding the spindle 7 at a point immediately to the rear of the rear ends of its fins 31. Threaded on the upper end of the pin 132 is a nut 137, and anchored thereto and to the rocker arm 133 (FIG. 2) is a torsion spring 138 serving to bias the trip extension 136 forwardly towards a pear impaled on the spindle 7. Formed integral with and depending from the left hand end of the rocker arm 133 is a flange 139, and secured thereto is a forwardly extending horizontal arm 141 formed at its outer end with inwardly and forwardly facing teeth 142. As shown in FIGS. 7 and 8, the latch 101 of the cup assembly lies adjacent the outer toothed end of the arm 141 during such time that a pear is being impaled on the spindle fins 31. Secured to and extending outwardly and rearwardly from the latch 101 forwardly of the pivot pin 102 is a detent or pawl 143. If then (as viewed in FIGS. 7 and 8), the rocker arm 133 is rotated counterclockwise about its pin 132 as the result of the abutment of the calyx end of a pear on the trip extension 136, the arm 141 will likewise rotate counterclockwise, and as a result of this, the teeth 142 will immediately engage the detent 143. This in turn will result in a counterclockwise rotation of the latch 101, whereupon the latch roller 104 will move out of locking engagement with its associated keeper lug 105, thereby to disengage the cup carriage 61 from the driven carriage 45 and to positively arrest the further forward movement of the cup carriage 61, while at the same time permitting the carriage 45 to complete its rearward movement as dictated by its control cam track previously described. The various elements of the carriage trip assembly should be so correlated that a rearward movement of the trip extension 136 in the order of not more than $\frac{1}{16}$ inch will cause the teeth 142 to come into engagement with the detent 143, and the torsion spring 138 should be sufficiently sensitive or soft to permit the rearward movement of the trip extension 136 in response to a very slight pressure. By observing these requirements, the engagement of the trip extension 136 by even a very soft pear will result in the immediate release of the cup carriage 61 from the driven carriage 45 without any further rearward movement of the pear. Here then we have provided a lost motion connection between the two carriages 45 and 61 whereby a pear, regardless of its length or hardness, can be precisely positioned on the spindle 7 at a predetermined point thereon relative to the calyx end of the pear, and therefore relative to the center of the seed-cell pod thereof. Furthermore, it is to be noted that by positioning the tripping mechanism laterally of the spindle rather than beneath it, the chances of fouling the mechanism by the falling thereon of cores and/or trimmings have been avoided.

Upon the return or forward travel of the carriages 45 and 61, the movement of the carriage 61 is arrested by the engagement of the follower roller 119 with the front vertical wall of its associated cam track 113 somewhat prior to the terminal movement of the carriage 45 as dictated by its control cam track, and as a result, the lost motion previously occurring between the two carriages is regained.

At this stage of the cycle of operation of the machine a pear has been coaxially impaled on the spindle 7, regardless of its size or hardness, with the fins 31 and their associated arcuate knives 33 centered within the seed-cell body of the pear. The pear gripping fingers have been retracted, and the two carriages 45 and 61 are in the process of returning to their starting positions. During this portion of the cycle of operation there has been no rotation of the spindle. The pear having been thus properly positioned and keyed to the spindle for rotation therewith can now be processed. Here it should be noted that the hollow spindle has already made a cylindrical cut axially through the pear and now contains therein the stem core, which latter must be removed from the spindle.

Peeling mechanism

Since the pear peeler here resorted to is disclosed in detail in our Patent No. 2,901,014 of August 25, 1959, for "Fruit Feeding, End Trimming and Knock-off Mechanism," and our Patent No. 2,742,067 of April 17, 1956, for "Pear Feeding, Stemming, End Trimming, Peeling, Seed Celling and Halving Machine," it will here be disclosed only to the extent necessary to show its correlation with the other elements of the machine.

Fixed to the frame 4 (FIG. 5) are a pair of axially aligned fore and aft bearings 151 and 152, and slidably mounted therein is a shaft or rod 153. Secured to the rod 153 are stop collars 154 and 155 for limiting the axial movement of the rod. Pivoted to the extreme rear end of the rod 153 by a pin 156 is a link 157 which in turn is pivoted by a pin 158 to the upper end of a crank 159. Journaled in the frame 4 transversely thereof is a shaft 161, the lower end of the crank 159 being keyed thereto as shown in FIG. 5. Also keyed to the shaft 161 is an arm 162 (FIG. 6) provided at its free end with a cam track follower roller 163 accommodated within a continuous cam track 164 (FIG. 18) formed in a cam 165, this cam being fixed to and rotatable with the main drive shaft 23. As a result of this construction, the linear or axial movement of the reciprocating rod 153 is under the control of the cam track 164 as indicated by the curve 164a of FIG. 24.

Secured to the forward end of the rod 153 (FIG. 5) is a fitting 166 and rigidly mounted thereon is an angle shaped carriage 167 (FIGS. 1, 2, and 5). Fixed to the front face of the carriage 167 is a bearing housing 168 (FIG. 1) and mounted therein is a vertical bearing 169. Journaled in said bearing is a depending shaft 171 and keyed thereto is a peeling knife assembly mounting 172. Fixed to the panel 3 is a bracket 173 and mounted thereon normal to the panel 3 is a fixed rack 174 (FIG. 2) having meshing engagement with a sprocket 175 keyed to the shaft 171. Due to this construction, the fore and aft movement of the carriage 167 results in the rotation of the shaft knife assembly mounting 172 about the axis of its supporting shaft 171. Pivoted to the upper end of the mounting 172 on a horizontal pin 176 is a fitting 176a, and mounted therein for vertical adjustment is a depending hollow shaft 177. Secured to the lower end of the hollow shaft 177 is a knife assembly generally designated by the reference numeral 178. Anchored to the fitting 176a and to the pin 176, and surrounding said pin, is a torsional spring 179 (FIG. 1) serving to bias the fitting 176a, the hollow shaft 177, and the knife assembly inwardly toward the axis of the shaft 171, and therefore into engagement with a pear supported on the spindle 7. As a result of this construction, the knife assembly is capable of a compound movement. It follows the forward-aft movement of the carriage 167 so that it can traverse the length of a pear; it can move laterally so as to follow the longitudinal contour of a pear under the biasing influence of the torsional spring 179; and it can rotate about the axis of the shaft 171 so that differently contoured portions of the peeling knife can be successively brought into cutting engagement with the pear as the knife moves bodily longitudinally of the pear. Here it should be noted that the knife assembly lies substantially in the horizontal plane of the spindle 7 (FIG. 2). It should further be noted that the peeling knife progresses from the calyx end of the pear to its stem end. Although not deemed necessary to here detail, means are provided for causing the knife assembly to swing outwardly away from the pear as soon as the peeling mechanism has completed its forward movement. During the peeling operation the spindle and the pear impaled thereon and keyed thereto are, of course, rotating.

Seed-cell pod coring mechanism

Trimming of both the calyx end and the stem end of the pear, and seed-cell pod coring thereof also occur during the rotation of the pear. To this end a bracket 191 (FIGS. 2 and 21) is attached to a forwardly extending portion of the frame 4, and mounted to and between said bracket and the panel 3 is a fixed rod or shaft 192. Slidably mounted on the shaft 192 is a carriage 193 provided at its outer front end with an upstanding dog 194 and provided at its rear end with an upstanding flange 195. Adjustably secured to the shaft 192 intermediate its ends is a stop collar 196, and surrounding said shaft between said stop collar and the rear end of the carriage 193 is a compression spring 197 serving to resiliently bias the carriage rearwardly. Secured to the carriage 167 through its fitting 166 is a depending arm 198, the lower free end of this arm being located in horizontal and vertical alignment with the dog 194 so that during the forward movement of the carriage 167 the lower end of the arm 198 will engage the dog, thereby to move the lower carriage 193 forward against the biasing action of the compression spring 197. This then constitutes a lost motion connection between the two carriages 167 and 193. As shown in FIG. 2, this mechanism is located substantially to the left of the spindle 7. Although not shown, an identical structure may be provided to the right of the spindle. Secured to and between the opposed transversely spaced flanges 195 and extending immediately forward of the panel 3 and above the spindle 7 is a cross bar 201. Adjustably secured to the cross bar 201 is a depending plate 202 (FIG. 1) terminating at its lower end in a horizontal, forwardly extending seed-cell pod coring knife 203 of arcuate cross-section, such section being formed on a radius substantially equal to the average radius of pear seed-cell pods. The length of the coring knife 203 should be substantially longer than the length of a seed-cell pod so that when the knife moves forwardly in response to the forward movement of the cross bar 201, it can make a cylindrical cut in the pear surrounding its seed-cell pod of a length equal to the length of the seed-cell pod. This, of course, means that the bar 201 must travel a total distance equal to the length of the seed-cell pod plus the distance between its starting position and the forward face of the trip extension 136 or the coincident calyx end of the pear impaled on the spindle 7 in its operative position. Here it should be noted that the coring knife is non-rotative, is advanced into the pear while the spindle is rotating, and should be relatively thin and narrow so as to enter the pear with the least possible frictional resistance. At this point the cylindrical seed-cell pod core is still attached at its forward end to the body of the pear.

Calyx end trimmer

Attached to the bar 201 over the plate 202 is a forwardly offset calyx end trimming knife 204 overlying the coring knife 203 (FIGS. 1 and 2). As illustrated in FIG. 2, the knife 204 is of triangular shape and is located above and to the right of the spindle 2. The calyx end trimming operation occurs concurrently with the seed-cell pod coring operation, for both knives are mounted on the common bar 201.

Stem end trimmer

Mounted on the panel 3 (FIGS. 10–16) is a forwardly extending bracket 211 provided intermediate its ends with a boss 212 (FIG. 10) and at its outer free end with a boss 213. Mounted in the boss 213 is a pin 214 and journaled thereon is the bifurcated end of a hinge plate 215 arranged to assume either an operative depending vertical position as shown in solid line in FIGS. 11 and 12, or a forwardly and generally horizontal inoperative position as shown in solid line in FIG. 13, or as shown in dash line in FIGS. 10, 11, and 16. Removably attached to the outer free end of the hinge plate 215 is a knife plate 216 formed at its outer end with a notch 217 arranged to straddle the spindle immediately rearward of the stem end of a pear (FIGS. 11 and 12). Secured to the rear face of the knife plate 216 contiguous to the notch 217 is a rearwardly offset stem end trimming knife 218.

Fixed to the carriage 167 in a vertical plane adjacent the vertical plane of the bracket 211 is a depending plate 221 (FIG. 11). Pivoted intermediate its ends to the boss 212 by a pin 222 (FIG. 10) is a dog 223, and pivoted to the plate 221 above the dog 223 by a pin 224 is a roller 225 arranged to ride on the slightly arcuate upper surface of the dog. Formed integral with the pivoted end of the hinge plate 215 is a short lever arm 226, and journaled on the end thereof is a cam track follower roller 227 constrained to follow a cam track 228 formed in the lower end of the bracket 221. As a result of this construction, the fore and aft movement of the carriage 167 and the bracket 221 constrains the hinge plate 215 to swing down to its vertical operative position and then up to its horizontal inoperative position. Formed integral with the inner end of the hinge plate 215 and extending outwardly therefrom is a lug or keeper 229, the outer end of the dog 223 being arranged to fall over and engage the keeper 229 upon the terminal inner movement of the bracket 221, thereby to hold the hinge plate 215 in its inoperative horizontal position. Anchored to and between the lower end of the bracket 211 and the hinge plate 215 at a point below the pivotal axis of the plate 215 is a tension spring 231 resiliently biasing the hinge plate 215 to its depending vertical and operative position (FIG. 11). Once the dog 223 is seated over the keeper 229 as shown in FIG. 16 it will remain in that position not only until the carriage 167 starts to move rearwardly but until such time as the roller 224 engages the inclined rear portion of the dog 223, thereby to cause the dog to rotate counterclockwise out of engagement with the keeper 229 as shown in FIG. 14. FIGS. 13 and 15 merely show intermediate positions of the mechanism. It will therefore be seen that the forward movement of the carriage 167 places the stem end trimmer in its operative position contemporaneously with placing the calyx end trimmer and the seed-cell pod coring knife into their operative positions and that the rearward movement of the carriage 167 results in inactivating these members and that all of these operations occur while the pear is rotating on and with the spindle 7. The operative movement of the hinge plate 215 is indicated by the curve 215a of FIG. 24.

Stem core pushout mechanism

Slidable within the hollow spindle is a stem core pushout rod 241 (FIG. 23) terminating at its rear end in a right angularly bent finger 242, the finger 242 being receivable in a slot 242a formed in the outer end of a rocker arm 243. Journalled in the frame or an extension thereof is a shaft 244, the rocker arm 243 being keyed intermediate its ends to said shaft. Also fixed to the shaft is an arm 244a. Keyed to the shaft 23 is a cam 245 formed with a cam track 246 arranged to receive a cam follower roller 247 journaled on the free end of the arm 244a. Each revolution of the cam 245 therefore results in the reciprocation of the push rod 241 within the spindle 7, thereby to push the stem core of a pear from the spindle in the sequence indicated by the curve 246a of FIG. 24.

Pear holding jaw assembly

Severing of the seed-cell pod core from the body of the pear and the sectioning of the pear occur while the pear is held on the spindle against rotation therewith.

To this end, and as illustrated in FIGS. 2, 19, and 20, a pair of laterally spaced, forwardly extending, parallel shafts 251 and 252 are journaled in suitable bearings affixed to the frame panel 3. Fixed to the shaft 251 is an arm 253 and a lever 254. Journaled on the free end of the lever 254 is a roller 255 arranged to contact a finger 256 keyed to the shaft 252. Also fixed to the shaft 252 or formed integral with the finger 256 is an arm 257 similar to the arm 253. Mounted on the free ends of the arms 253 and 257 are arcuate jaws 258 and 258a, arranged to close concentrically about the bulbous portion of a pear operatively impaled on the spindle 7. Fixed to the shaft 252 is a lever 259, and journaled on the free end thereof is a follower roller 261.

Journaled in a bearing 262 mounted on the panel 3 and extending rearwardly therefrom is a pin 263, and pivoted on the pin 263 is a rocker arm 264 provided at its upper end with a track 265 having engagement with the roller 261. Anchored to and between the arms 253 and 257 is a tension spring 266 serving to resiliently urge the jaws 258 and 258a to their closed position over a pear. Mounted on the shaft 23 (FIGS. 6, 19, and 20) is a cam 267 provided with a cam track 268, and journaled on the lower free end of the rocker arm 264 is a cam follower roller 269 arranged to traverse and follow the cam track 268 in accordance with curve 268a of FIG. 24. As a result of this structure, the jaws 258 and 258a are constrained to periodically and simultaneously close on the pear and then open once during each cycle of operation of the machine in response to the rotation of the cam 267.

From the curves of FIG. 24, it is to be noted that the spindle 7 makes about one complete revolution during the interval that the pear is held against rotation by the jaws 258 and 258a and that the arcuate knives 33 secured to the forward ends of the fins 31 (FIG. 4) operate at this time to sever the forward end of the cylindrical seed-cell pod core from the body of the pear.

Pear sectioning knife assembly and seed-cell pod core disintegrator

Journaled in the frame panel 3 and in one of the side frames of the machine are vertically spaced, horizontal shafts 271 and 272 (FIGS. 1, 6, and 22). Keyed to the shafts 271 and 272 are meshing gear sectors 273 and 274, and formed integral with the gear sector 274 below its shaft 272 is a rearwardly extending arm 275. Keyed to the shaft 23 is a cam 276 formed with a cam track 277 arranged to receive a cam follower roller 278 journaled on the outer free end of the arm 275.

Keyed to the shafts 271 and 272 are arms 279 and 281 extending forwardly of the machine through a slot formed in the panel 3, and secured to the outer ends thereof in the vertical plane of the spindle 7 are opposed knives 282 and 283. Formed on the lower side of the knife 282 are downwardly and rearwardly facing cutting edges 284, 285, and 286, the edge 286 being located forwardly of the stem end of a pear operatively impaled on the spindle 7. Formed on the knife 283 is a rearwardly facing cutting edge 287 located forwardly of the stem end of said pear. As a result of this construction, the knives 282 and 283 are constrained to close on each other forwardly of the stem end of a pear impaled on the spindle 7 once during each cycle of operation of the machine under the influence of the cam track 277 and in accordance with the cam track curve 277a of FIG. 24. It is to be particularly noted that the closing of the knives 282 and 287 does not result in piercing the flesh of the pear or in the sectioning or halving of the pear. This, as will be presently explained, occurs only when the pear is forced forwardly into and through the knives during the very end of the cycle of operation of the machine.

Attached to the upper knife 282 is depending arm 288 provided at its lower end with a finger 289 receivable in the fin notches 32 when the knives 282 and 283 are in their closed position and during that interval of time that the pear is held against rotation by the holding jaws 258 and 258a. The function of the finger 289 is to disintegrate or break up the seed-cell pod core, thereby to insure the extraction thereof from the pear as the pear is finally pushed forwardly off the spindle.

*Pear push-off assembly*

Mounted in the frame 1 and its panel 3 (FIG. 26) are slide bearings 291 and 292 in vertical alignment and in parallelism with the spindle 7. Slidable within the bearings 291 and 292 is a pear push-off rod 293 and attached to the leading edge thereof is an upstanding fork 294 arranged to partially surround or straddle the spindle 7. Linked to the rear end of the rod 293 is a lever 295 journaled intermediate its ends on the shaft 244. Keyed to the main drive shaft 23 is a cam 296 and formed therein is a continuous cam track 305. Pivoted to the lower end of the lever 295 is an arm 298 provided at its outer end with a fork 299 arranged to straddle the shaft 23 and to have translatory movement relative thereto. Journaled on the arm 298 intermediate its ends is a cam follower roller 301 receivable in the cam track 305 and therefore constrained to move in response to the rotating of the cam 296 in accordance with the curve 305a of FIG. 24. As will be seen from an inspection of this curve, the pear push-off fork 294 advances forwardly once during each cycle of operation of the machine to push a processed pear through the knives 282 and 283 and off the spindle 7 at about the 20-degree position of the machine and then immediately returns to its retracted inoperative position for the remainder of the cycle of operation. The sequence of operation of the pear holding jaws, the splitting knives and the pear push-off mechanism can be seen from an inspection of curves 268a, 277a and 305a of FIG. 24. From these curves it can be seen that the holding jaws first start to close and that this is immediately followed by the closing of the splitting knives. Just before the knives start to open, the pusher goes into operation.

*Deflecting plate assembly for segregating pear halves and refuse*

Secured to the lower edge of the panel 3 (FIG. 1) is a bracket 311 and journaled therein is a pin 312. Keyed to the pin 312 is a lever 313 and pivoted to the free end thereof by a pin 314 is a connecting rod 315.

Mounted on the opposed side frames 4 are opposed, depending brackets 316, and journaled therein is a transverse shaft 317. Clamped to and along the length of the shaft is a plurality of fittings 318, one of which is provided with a depending lever 319 terminating in a bearing boss 321. Adjustably mounted on the end of the connecting rod 315 is a fitting 322 pivotally connected to the lever 319 by a pin 323. Fixed to the fittings 318 is a transversely extending deflecting plate 324 disposed beneath the spindle 7 and the sectioning knives 282 and 283. As illustrated in FIG. 1, the plate 324 is in a rearwardly inclined position, thereby to deflect whole or halved pears forwardly of the machine into a suitable container located beneath and forwardly of the deflecting plate 324, or onto an endless conveyor located in this zone and traveling transversely of the machine.

Also fixed to the shaft 312 is an arm 325 formed along its lower edge with a shoe 326 merging with an inclined shoulder 327. Journaled on the cam 276 is a roller 328 arranged to rotate under the shoulder 327 and the shoe 326 and in contact therewith during a portion of each revolution of the cam 276, thereby to rock the deflecting plate 324 about the shaft 317 from a rearwardly inclined position as shown in FIG. 1 to a forwardly inclined position. In its latter position (rearwardly declining) the plate 324 is in a position to deflect refuse such as pear peelings, cores, and stem and calyx end trimmings downwardly and rearwardly of the deflecting plate into a suitable container. During that portion of each revolution of the cam 276 that the roller 328 is out of engagement with the shoulder 327 or sleeve 326, the shoe rides on the periphery of a circular boss 329 (FIG. 6) formed integral with the cam 276 and concentric to the shaft 23. For the greater part of each cycle of operation of the machine the plate 324 is rearwardly declined in a position to deflect refuse rearwardly and downwardly. It is only once, and then only for a short interval of time, that the deflecting plate 324 is forwardly declined as shown in FIG. 1, this interval coinciding with the interval during which processed whole or halved pears are being discharged from the machine. The cycle of operation of the deflecting plate and its relation to the cycle of operation of the other elements of the machine is indicated by the curve 326a of FIG. 24. Here it should be noted that as viewed in FIG. 1, the shaft 23 is arranged to rotate clockwise and that therefore the roller 328 first rotates about the axis of the shaft 23 into rolling engagement with the inclined shoulder 327, thereby to rotate the arm 326, the lever 313, and the plate 324 clockwise to the position of these parts as shown in FIG. 1.

*Sequence of operation of various assemblies*

The movement of each of the subassemblies above described and the relation thereof to the movement of each of the other subassemblies is diagrammatically indicated in the graph of FIG. 24. Each curve shows the movement of one of the cam followers or represents the effective contour of its cam track which has been plotted against the 360 degrees of travel of the cam track. Each curve shows the effective contour of the cam track indicated, and consequently represents the character of movement of the cam follower associated with the cam track in question. The movement of the element actuated by each cam follower is, of course, proportional to the movement of the cam follower but may be greater or less depending upon the particular linkages involved. At the start of the cycle of operation (0° on the graph), the pear centering cup 65 is in its vertical position with its pear gripping fingers 69 in their fully open position ready to receive a pear from the operator. However, for more clearly illustrating the machine, the drawings (full line) disclose its various parts at 30 degrees from their initial or starting point.

Contour of processed pear half

FIG. 25, as above stated, discloses a finished half pear processed on the machine above described. From this figure it will be seen that the spindle 7 has formed therein a stem core bore 331, that the coring knife 203 has formed a cylindrical seed-cell pod core bore 332, and that the small arcuate knives 33 attached to the spindle 7 and fins 31 have formed an arcuate wall 333 between and joining the two bores 331 and 332. The outer contour of the peeled pear is precisely the same as the contour of the unpeeled pear, for the peeling knife has merely cut a continuous, skin thin, ribbon therefrom.

Miscellaneous

For the purpose of making diced pears for fruit cocktails, it is advantageous to use whole pears rather than halved pears, this being for the reason that a greater quantity of the diced product (about 5 percent greater) can be derived from a whole pear than from two halves of such pear. To this end, the sectioning knives 282 and 283 of the machine can be dispensed with or inactivated.

It should be noted that throughout the specification and claims hereof the terms "forward," "front," and "fore" have reference to the front of the machine or that portion thereof where the operator is located to deliver pears to the centering cups.

As is apparent from the above description, the entire processing of a pear occurs while the pear is on the spindle 7. Otherwise expressed, each of the various steps of the complete operation is performed at a single station. This, of course, has imposed the condition that all of the processing elements of the machine have had to be clustered and closely confined about the finned portion of the spindle. To meet this condition and the further condition that the various subassemblies are required to operate in a predetermined sequence, great care has had to be taken in determining the location, dimensions and extent of movement of each subassembly and in correlating their operations. These problems do not occur in machines of the type wherein during the processing of a pear the pear is moved from one station to another, for in such machines there is considerable more clearance available for the location and operation of each of the required subassemblies.

In actual practice a bank of several of the units above described are incorporated in each machine side by side and all driven in unison from a common drive shaft. From actual tests made during the 1955 pear season it has been found that a machine made of six such units can be fed conveniently by an operator from an endless conveyor traveling transversely of the machine immediately in front thereof.

As a result of our machine, grading of the pears prior to processing is obviated, for within all practical limits the machine will handle all pears irrespective of size and hardness. The machine will conveniently handle a greater number of pears in a given time than competitive machines. The tonnage resulting from processing a given number of pears is greater than that derived from competitive machines for losses from peeling, trimming, and coring are less. And finally, since the machine will produce processed whole pears, a greater yield of diced fruit can be obtained from a given tonnage of pears than previously possible from the same tonnage of halved pears otherwise processed in exactly the same way.

We claim:

1. A pear processing machine comprising: a frame; a hollow spindle journaled in said frame and having one end thereof extending forwardly thereof, said spindle being provided with a set of radially extending fins at a point rearwardly from its outer end and being arranged to have a pear coaxially impaled thereon with its seed-cell pod surrounding said fins; a carriage movably mounted on said frame rearwardly of said fins and for translatory movement in parallelism with said spindle; a forwardly extending seed-cell pod coring knife mounted on said carriage; means for moving said carriage forwardly so as to cause said knife to enter said pear; and means for simultaneously rotating said spindle.

2. In a machine of the character defined in claim 1, a seed-cell pod core severing knife extending between said spindle and one corner of one of said fins.

3. In a machine of the character defined in claim 1, a plurality of splitting knives mounted on said machine for movement in planes containing the axis of said spindle and arranged to close upon themselves adjacent the axis of said spindle in advance of said fins; and a pusher surrounding said spindle rearwardly of said fins and arranged to move forwardly along said spindle, thereby to push said pear through said knives.

4. A pear processing machine comprising: a frame; a hollow spindle journaled in said frame and extending forwardly thereof; a reciprocating carriage mounted on said frame for fore and aft movement away from and towards said spindle; ways mounted on said carriage in parallelism with said spindle; a pear centering and feed cup assembly slidably mounted on said ways; a latch rocker arm pivoted intermediate its ends to said pear centering and feed cup assembly on a vertical axis and generally parallel to said spindle; a keeper lug mounted on said carriage for detachable engagement with the rear end of said latch rocker arm, thereby to constrain said cup assembly to travel rearwardly with said carriage towards said spindle; a trigger rocker arm mounted on said frame intermediate its ends and laterally adjacent said spindle substantially in the horizontal plane thereof, one end of said trigger rocker arm being forked and partially surrounding said spindle at a predetermined point thereon; means for forwardly and resiliently biasing the forked end of said trigger rocker arm towards said feed cup; a forwardly extending arm secured to the opposite end of said trigger rocker arm, said arm being generally parallel with said ways and adjacent to said latch rocker arm and overlapping the locus of said latch rocker arm; and means on the forward end of said arm engageable with the forward end of said latch rocker arm in response to the rearward movement of the forked end of said trigger rocker arm for disengaging said latch rocker arm from said keeper lug and for arresting the further rearward travel of said feed cup assembly but permitting said carriage to continue its rearward movement.

5. A pear processing machine comprising: a frame; a forwardly extending spindle journaled in said frame cantilever fashion; radial fins provided on said spindle intermediate its ends; means for impaling a pear on said spindle coaxially therewith and with the seed-cell pod of said core encompassing said fins; a carriage mounted on said frame for fore and aft movement over said spindle; a hinge plate pivoted to said frame on a horizontal axis for swinging movement from a generally horizontal, inoperative position to a depending, substantially vertical, operative position, said hinge plate being provided with a notched finger arranged to seat on said shaft immediately rearwardly of the stem of said pear; a pear stem-end trimming knife mounted on the rear side of said finger immediately adjacent its said notch; and means responsive to the forward movement of said carriage for swinging said hinge plate downwardly from its horizontal inoperative position to its vertical operative position.

6. In a machine of the character defined in claim 2; pear holding jaws mounted on said frame; and means for closing said jaws upon said pear to thereby hold said pear against rotation during at least a partial rotation of said spindle.

7. A machine of the character defined in claim 1, wherein said fins are formed with circumferentially aligned notches, and wherein a finger is movably mounted on said frame for movement into said pear and into said notches while said pear is held against rotation and while said spindle is rotating.

8. A pear processing machine comprising: a frame; a spindle journaled in said frame and provided intermediate its ends with a plurality of radially extending pear keying fins, said fins being formed intermediate their ends with peripherally aligned notches; a carriage mounted adjacent said spindle for movement in axial parallelism with said spindle; a seed-cell pod coring knife mounted on said carriage in parallelism with said spindle and radially spaced from the axis of said spindle a distance slightly greater than the maximum radius of said fins; and a finger pivoted to said frame for movement in a plane substantially containing the axis of said spindle, said finger being arranged to move into the said notches of said fins.

9. The method of preparing a pear for canning comprising: impaling said pear coaxially on a hollow spindle, thereby to make a cylindrical axial cut in said pear circumscribing its stem core; rotating said spindle and pear and simultaneously causing a peeling knife to travel along the length of said pear in conformation with the contour thereof; advancing a seed-cell coring knife into the calyx end of said pear in parallelism with the axis of said spindle and radially spaced therefrom a distance substantially equal to the radius of the seed-cell pod of said pear while rotating said pear, thereby to form a cylindrical seed-cell pod core; trimming the stem and calyx ends of said pear while rotating said pear; arresting the rotation of said pear and while said pear is stationary, severing said cylindrical seed-cell pod core from the body of said cell and finally pushing the resulting processed pear from and off said spindle.

10. A hollow pear processing spindle provided with a radially extending fin having an outer corner at one end thereof; and an arcuate wire knife connected at one of its ends to said corner and at its other end to said spindle at a point spaced from said fin.

11. A whole peeled pear having a cylindrical core cavity extending axially into the pear from the stem end substantially as far as the cell pod, and a coaxial cylindrical cavity of larger diameter than said first cavity extending from said first cavity through the blossom end of said pear.

References Cited in the file of this patent
UNITED STATES PATENTS

| | | |
|---|---|---|
| 1,191,831 | Royer et al. | July 18, 1916 |
| 1,583,100 | Reynolds | May 4, 1926 |
| 1,825,470 | Musselman | Sept. 29, 1931 |
| 2,056,413 | Thompson et al. | Oct. 6, 1936 |
| 2,187,075 | Coons | Jan. 16, 1940 |
| 2,418,805 | Lindner | Apr. 8, 1947 |
| 2,664,129 | Coons | Dec. 29, 1953 |
| 2,693,210 | Gustafson | Nov. 2, 1954 |
| 2,703,122 | Pease et al. | Mar. 1, 1955 |